United States Patent [19]

Feldpausch

[11] Patent Number: 5,098,731
[45] Date of Patent: * Mar. 24, 1992

[54] BANANA BASED FROZEN-NONDAIRY DESSERT

[76] Inventor: David Feldpausch, 737-11 Woodside La. East, Sacramento, Calif. 95825

[*] Notice: The portion of the term of this patent subsequent to Aug. 14, 2007 has been disclaimed.

[21] Appl. No.: 534,532

[22] Filed: Jun. 5, 1990

[51] Int. Cl.$^5$ .............................................. A23G 9/02
[52] U.S. Cl. ................................. 426/565; 426/566; 426/567
[58] Field of Search ............... 426/565, 566, 567, 100, 426/101, 524, 569

[56] References Cited

U.S. PATENT DOCUMENTS

| 1,917,137 | 7/1933 | Marchio | 426/101 |
| 4,724,153 | 2/1988 | Dulin et al. | 426/566 |
| 4,851,247 | 7/1989 | Greenhouse | 426/565 |
| 4,948,614 | 8/1990 | Feldpausch | 426/565 |

FOREIGN PATENT DOCUMENTS 0797646  1/1981  U.S.S.R. .................. 426/567

Primary Examiner—Jeanette Hunter
Attorney, Agent, or Firm—Mark C. Jacobs

[57] ABSTRACT

A frozen-nondairy dessert having the creamy texture and the mouth feel of an ice cream product comprised of a frozen banana based composite of bananas alone or in combination with flavor providing substances. Preferably ripe banana or banana mixture which has been quick frozen preferably in small mass units and maintained in a frozen state till time of use. The frozen banana composite is first masticated, then whipped to achieve a significant overrun and either served immediately, or refrozen, preferably quickly for future use.

Fruits, nuts, and flavorings may be blended into the banana composite prior to the freezing step or they can be mixed with the frozen composite during mastication or aeration.

14 Claims, 1 Drawing Sheet

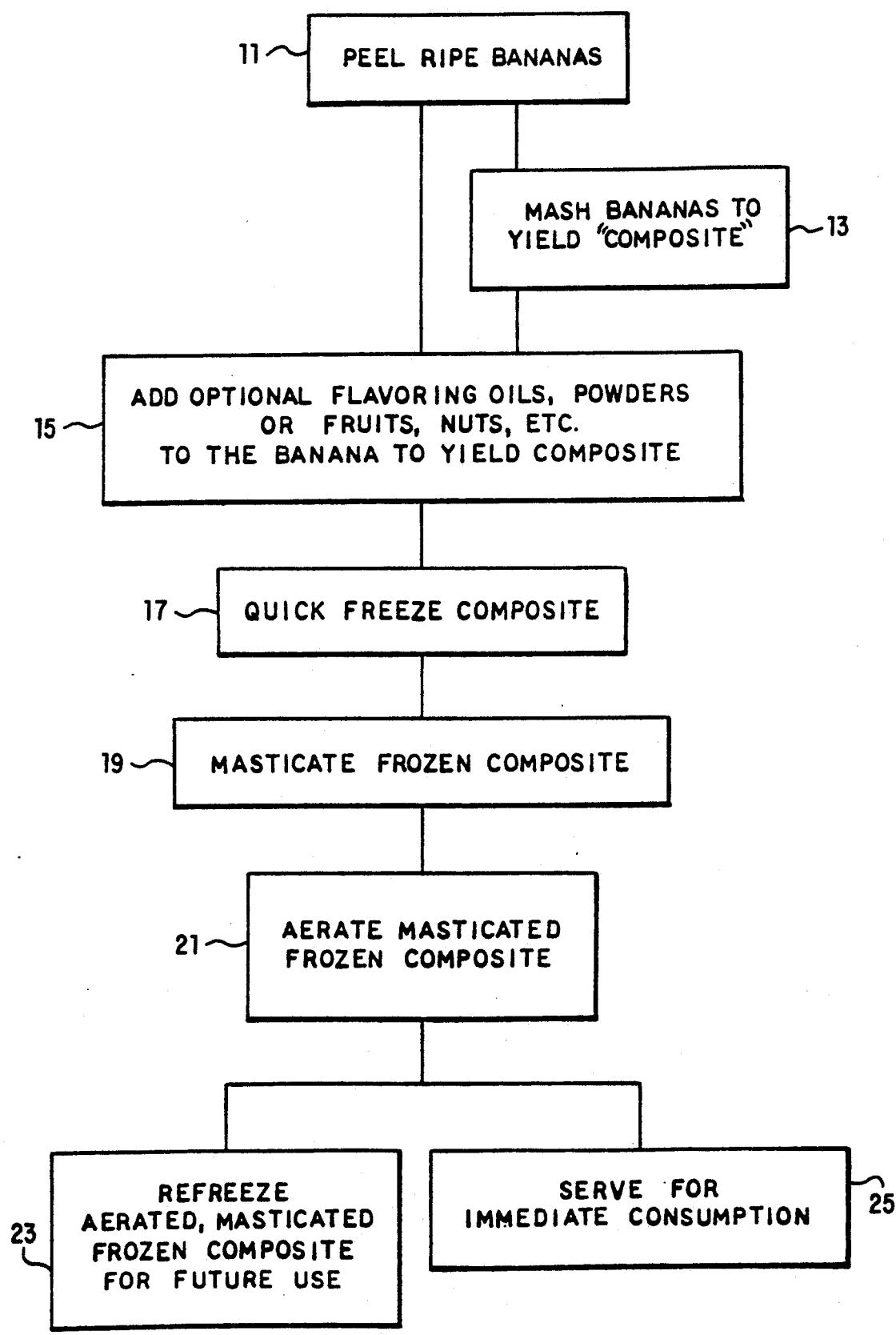

BANANA BASED FROZEN-NONDAIRY DESSERT

BACKGROUND OF THE INVENTION

Today's population is becoming more and more health and health food conscious. Witness the continuing ban on cigarette smoking and the increase of availability of organically grown foods. More and more Americans are desirous of cutting down on their intake of presevatives and food additives. In addition there is a segment of the population that is attempting to reduce its intake of fats and cholesterol. There is also a segment of the population that needs to exclude dairy products from its diet due to allergy. For these people and others there is a need for healthful desserts, that allows them to exclude the above named non-desired products from their diets.

It is an object therefore of this invention to provide a nondairy based dessert that utilizes as its base ingredient quick frozen preferably ripe bananas.

It is another object of this invention to provide a frozen dessert that can be made without the addition of food additives and preservatives.

It is yet another object to provide a frozen dessert that can be made substantially fat free.

This and other objects of the invention will in part be obvious and will in part appear hereinafter.

The invention accordingly comprises the product possessing the features, properties and the relation of components and the process involving the several steps in relation and order of one or more of such steps with respect each of the others all of which are exemplified in the following detailed disclosure and the scope of the application of which will be indicated in the claims.

For a fuller understanding of the nature and objects of the invention reference should be made to the following detailed description taken in conjunction with the accompanying drawing.

BRIEF DESCRIPTION OF THE FIGURES

The figure is a block diagram illustrating the preferred mode of manufacture of the frozen dessert of this invention.

SUMMARY OF THE INVENTION

A nondairy frozen dessert comprised of a quick frozen banana based composite which has been masticated and whipped to achieve a significant overrun.

Bananas may be used alone or in combination with other flavoring agents such as fruits, nuts as well as liquids such as vanilla extract, oils such as mint and powders or liquors such as chocolate and carob; all of which are added primarily prior to the freezing step to form what is designated as the composite. Alternatively these flavor providing substances can be mixed and blended into a frozen banana only, composite during mastication. If the other flavorant is a liquid, such as spearmint oil or fruit extracts, then the flavorant can be added even during the aeration step.

DESCRIPTION OF THE PREFERRED EMBODIMENT

The present invention relates to a non-dairy frozen confection which has properties such as taste and mouth feel similar to soft serve ice cream, frozen yogurt and Dole Whip TM.

My invention differs from all of these products which start with a liquid which is a mixture of some or all of the following; dairy products, water, fruit concentrates, sugar, emulsifiers, stabilizers, colors, and fats derived from vegetable, and/or animal sources. In these prior art products, the liquid is cooled and frozen while being whipped. The whipping action is what gives the products its overrun which is the entrainment of air therein. The percent of overrun is an expression of the amount of air that is frozen in said dessert.

My invention preferably involves the steps of using whole ripe bananas singularly or mixed with other fruits, nuts, oils or powders or liquors at room temperature and the "quick freezing" of that mass to form a composite; (b) then storing the frozen composite in a conventional freezer at around 0 degrees F. to −15 of degrees F., and when the frozen composite is either ready to be consumed or repackaged, first masticating and then whipping the composite into a mass to give desired overrun qualities. If the mass is to be repackaged for later consumption it is again quick frozen and stored in a conventional freezer.

In order to obtain the optimum dessert, care should be exerted in the selection of the bananas to be employed for the base i.e. the composite; of this dessert. Properly chosen bananas have just the right amount of starch, carbohydrates, cellulose, pulp and pectin to work best in this process. Thus the bananas should be stored such as to avoid extreme heat and cold. When bananas approach their freezing point, the skin turns brown and more importantly the starch therein will not effectively turn to sugar. Permitting the banana's starch content to break down into sugars (glucose, fructose and sucrose) is of utmost importance to maximize flavor. Thus it has been noted that when the banana skin is yellow green, 40% of the carbohydrates are in the form of starch while after ripening, only 8% are still starch, the rest having broken down into natural sugars. It is important also not to try to obtain the last bit of starch to conversion, since bananas left too long will have their sugar content start to ferment. The ideal ripening temperature is about 78 degrees Fahrenheit, and temperatures below 55 degrees Fahrenheit should be avoided.

In view of the high natural sugar content, and the presence of the banana pulp, there is little or no need for added sugar for either sweetening or for thickening purposes. The relative smoothness of the prepared pulp closely approximates the mouth feel that is obtained from the addition of fats, such as butter fat and emulsifiers and stabilizers to frozen desserts. Brown colored small spots on a yellow skin is a good colorimetric indicator of adequate ripening for use in the process of this invention. Almost any variety of banana may be employed herein other than plantains and related varieties whose starch does not turn to sugar and which upon ripening assume a consistency of potatoes, i.e. relatively hard.

The bananas which may comprise all or part of the composite, are first peeled. They then may be mashed into a pulp, by hand or mechanically or quickly sliced into wafers of about thicknesses 1/16 to ⅛ inch thick, or if desired they may left in an unaltered though peeled state. The initial preparation, if any, should take place quickly such that oxygen induced browning discoloration is avoided. The choice of preparation mode will be related to the quick freeze mode to be employed. For example if ice cube type trays carrying banana in the compartments are to be utilized, placement of a wafer in each compartment of the tray, or a filling of the tray with banana pulp mark would be satisfactory. On the other hand, if the bananas are to be placed on an endless belt and moved continuously through a freezing chamber, then no initial preparation is required.

Whole bananas or banana chunks can be used as the composite, if the frozen dessert is to be solely banana. But if the dessert is to include other flavorants such as berries, nuts, etc, it is preferred that the banana be mashed to a pulp to aid in the ultimate incorporation of such flavorants prior to the freezing step.

Mashing of the banana, especially when it is to be united with other materials of a liquid or powder nature, is recommended. This eases the incorporation of the other ingredients, and permits placement of uniform amounts into little molds such as ice cube trays adapted for the plate freezing technique.

The standard commercially available banana puree is not acceptable for use in making the frozen dessert of this invention. In making a puree, the reduction of the fruit to such small particle sizes causes the introduction of a significant amount of oxygen. This oxygen is the fuel for the enzyme polyphenoloxidase present in the banana, which aids very quickly to turn the banana puree brown. Thus commercially prepared banana puree is heat treated and subjected to an antioxidant such as ascorbic acid, to impede or prevent this browning reaction. On the contrary, I avoid using an antioxidants in the desserts of this invention.

Since the other flavorants may be added prior to the quick freezing step, such additions should be discussed at this time. Additions to preformed composites will be discussed infra.

As noted before, to ease the incorporation of flavorants, the banana should be mashed in order to permit uniform incorporation. Liquids such as peppermint oil are merely mixed in by hand or machine, while taking care to limit or prevent air entrainment.

Nuts are chopped up and hand or machine kneaded into the banana machine. Fruit segments or pieces such as pineapple are incorporated in like fashion to ensure a homogenous mixture with minimal air content.

Whether the other or additional flavorant is added during composite formation, or subsequently the amount of addition will be same. Based on total weight of composition (excluding air) that is entrained I have found that fruit may range from about 0 to 40 per cent, nutmeats 0 to 15 per cent, flavoring oils 0 to 1 per cent and chocolate flavors selected from cocoa powder, carob, and chocolate liquor from about 0 to 5 per cent.

The importance of the quick freezing of the fruit composite is three fold and cannot be overlooked. First, quick freezing allows for an extremely creamy texture with the absence of any perceived ice crystals when the product is being eaten. Secondly quick freezing also improves shelf life, flavor and color. Thirdly quick freezing increases overrun. Quick freezing is not mode dependent, but rather time dependent. That is, one desires to obtain a frozen composite having ice crystals of the smallest possible size. While immersion in liquid nitrogen to achieve a frozen state in seconds is indeed an employable technique, it is rather expensive relatively to do so.

In order to achieve the desired mouth feel and texture without achieving large ice crystal size I can use any of the following "quick freeze" type freezing techniques; (1) Immersion, i.e. the immersion into a cryogenic fluid such as liquid nitrogen; (2) blast freezing, where the apparatus utilizes the concept of the wind-chill factor, by having rapidly moving cold air withdraw the heat from the material to be frozen; (3) Plate Freezing—where the item to be frozen is placed in direct contact with a cold freezing surface. Fish sticks are frozen in such a manner.

When fruit is frozen in traditional modes, slowly, which can take anywhere from one (1) to six (6) hours, the water contained in said fruit has ample time to form large ice crystals. These crystals burst the very delicate cellular walls which carry the integrity of the fruit's characteristics. Also when these cell walls are destroyed it hastens the action of polyphenoloxidase, which is an enzyme which causes oxidation of the fruit, turning it brown and disturbing its flavor. Quick freezing on the other hand, does not allow time for the water to form large crystals, thus preserving the cellular walls and holding the integrity of the fruit's characteristics. The effect of quick freezing upon the enzyme polyphenoloxidase is to almost completely eliminate its enzymatic action, while the composite is frozen, and greatly slows it down while the product is being consumed. While any hastening of normal freezing time will improve the product, the desired goal to achieve the optimum product is to reach the frozen state in less than 10 to 15 minutes. This is obtainable by freezing the banana or banana mixture in small quantities about the size of oversized ice cubes or smaller. The temperature to store frozen composite should be between 0 degrees and $-15$ degrees F. or colder, in order to quench all of the enzymatic action discussed above.

As noted previously, freezing is not to be considered the addition of cold, but rather the removal of heat. The removal of heat is facilitated by the enlargement of the surface area of the material to be frozen and reducing its mass. Thus it is recommended that the banana composite be cut into small segments of up to about 2 inches long to maximize the surface area and reduce its mass in order to achieve quick freezing by whatever method is chosen, immersion, spraying or mere placement on freezer plates.

HARDWARE AND PROCEDURE

The frozen dessert of this invention requires essentially two procedural steps which will be described below. The first piece of hardware is one having a series of rotating blades to masticate the frozen composite. The term composite is utilized to refer either to the banana alone or to the mixture thereof with fruits, nuts, oils and the like as previously discussed. Thus, frozen composite refers to the composite after quick freezing.

The mastication blades chew up the frozen composite into a dense custard like pulp, designated the mix. The second piece of hardware acts to whip the mix to a state of homogeneity; and to entrain the desired amount of air to achieve a frozen dessert product of the desired taste and consistency. Overrun, the act of entraining air in the mix, can range from 30 to 100 percent with about a 60% increase in volume be the most preferable.

The two steps to prepare the final dessert from the frozen composite can take place in two different pieces of hardware or in one as may be desired.

While there are many suitable devices in the market place that can carry out the two main steps involved herein, I have found that particularly satisfactory mastication can take place with the Champion Juicer made by Plastaket Manufacturing Co, Inc. of Lodi, Calif. Various electric mixers having beater attachments such as made by Sunbeam, Hamilton Beach and others can be used to entrain the air to achieve the desired overrun level.

The reader's attention is now turned to the FIG. Invention 10 is seen to comprise a plurality of steps, all of which are described in detail within the confines of this application. First the operator should PEEL RIPE BANANAS, 11. The second step is to take the peeled bananas and preferably then MASH BANANAS TO YIELD COMPOSITE, 13. The word composite is merely used as a term of reference to differentiate the mash from the whole banana. While mashing has been suggested to render the incorporation of other fruits and nuts as well as flavors such as peppermint oil, powders such as cocoa and carob easier, such mashing is not a necessity prior to the incorporation since adequate mixing during the next incorporation step will yield a homogeneous product ready for freezing.

A further benefit of mashing banana used alone is that in the freezing step, the next step, uniform amounts can be put into containers such as ice cube trays if the banana is mashed rather than left in 1 inch or 2 inch segments.

After the suggested mashing, one then takes the step to ADD OPTIONAL OIL, POWDERS, FRUITS OR NUTS 15. After this incorporation, the operator uses any of the procedures discussed to QUICK FREEZE COMPOSITE 17. The frozen composite can be stored for several months if desired or used to prepare end product the same day according to the operator's desires.

The next step is to masticate, i.e. form a heavy puddinglike mass from the larger frozen sample. Thus the operator is directed to MASTICATE FROZEN COMPOSITE 19. This is followed by the aeration step, which requires one to AERATE MASTICATED FROZEN COMPOSITE 21 to achieve a significant overrun.

One may now either REFREEZE A.M.F.C. FOR FUTURE USE 23, or if desired SERVE FOR IMMEDIATE CONSUMPTION, 25. The following non-limiting examples are to viewed as exemplary of the process of this invention. Examples 1-6 illustrates the blending of other ingredients with the banana base to make the various frozen composites. [28.35 grams = 1.0 ounce].

EXAMPLE 1.

ALL BANANA

Let bananas of good quality ripen undisturbed until; most of the starch has turned to sugar. Then peel ripe bananas either mash the pulp or leave the banana whole while maximizing surface area and minimizing mass. The banana is put through the quick freeze process with target freezing time of less than 10 to 15 minutes. The frozen pulp is then stored in regular freezer at a temperature of around 0° F. to −15° F., after being wrapped in plastic to protect the pulp from the ambient air which carry both moisture and contaminants. When needed, the frozen composite is masticated, homogenized and whipped to a target overrun of preferably about 60%, or to desired taste and consistency. The product can now be consumed or quick frozen again to be consumed later.

EXAMPLE 2

STRAWBERRY-BANANA

The procedure for using ripe bananas is the same as in Example 1. Strawberries are cleaned and cut into smaller pieces and blended with peeled ripe bananas. This composite is then poured into suitable molds then quick frozen followed by storage in a regular freezer prior to ultimate processing.

The proportion of strawberry to banana is defined only by individual taste. Using 8 ounces of banana as a constant and adding progressively more grams of strawberry up to 64 grams gives a progressively more strawberry flavor and color. At 64 grams a nice red color and clearly strawberry flavor is achieved. Although the strength of both the flavor and color is enhanced after 64 grams it is not as dramatic as before. In taste tests it was found that at 112 grams the flavor starts to become too tangy and not as pleasant as before at smaller proportions. 64 to 96 grams seemed to be the most popular.

EXAMPLE 3

BANANA AND PINEAPPLE

The procedure and proportions are almost identical to strawberry except that the color remained constant.

EXAMPLE 4

BANANA AND PECANS

The procedure for using ripe bananas is the same as mentioned earlier. It is important to note that the nuts to be used must be fresh. If they have started to turn rancid, beside the obvious taste consideration, the rancidity will accelerate the oxidation of the frozen composite. Pecans should be slightly chopped to ensure a more uniform mixture. When I used 8 ounces of banana as a constant and added more and more grams of pecan, the pecan flavor became more and more prominent up to the 14 gram point, at which it begins to overtake the banana flavor. As the amount of pecans increases the flavor becomes more and more intense. At 24 grams the banana influence appears lost. In taste tests around 18 to 24 grams of pecans per 8 ounces of banana was the most popular.

EXAMPLE 5

BANANA AND CHOCOLATE

Pure chocolate liquor was used. Using 8 ounces of banana as a constant, I added more and more chocolate in ½ gram increments. In taste tests, the preference was for between 5 and 7 grams. At 8 grams the cocoa flavor started to become to strong.

EXAMPLE 6

BANANA AND PEPPERMINT

Non-alcoholic natural peppermint flavor was used. 8 ounces of banana was again used as a constant and drops of flavor were added. Anything over 4 drops were too strong. The preferred formula utilized between 2 and 3 drops per 8 ounces of banana.

The following example pertain to the use of various machines to entrain air, i.e. obtain overrun. The overrun with any one machine is seen to be increased when the quick freeze method of this invention is employed.

EXAMPLE 7

A plurality of 4 oz. increments of unmasticated banana were placed in ice cube trays and frozen using both the quick freeze and conventional freezing methods described elsewhere herein. Uniform 4 oz. samples from the batches of quick frozen and conventionally frozen prepared banana were measured to determine their volume which formed a K factor. The original volume was designated as 100%. After treatment the volumes were remeasured to determine the new volume.

a. Two four ounce supply of cubes were placed in Champion Juicer and forced through the machine.

| Conventional Freezer | 127% overrun |
|---|---|
| Quick Freeze | 136% overrun | b. A second pair of 4 ounce samples were treated by a proprietary chopper aeration device.

| Conventional Freezer | 134.5% overrun |
|---|---|
| Quick Freeze | 149% overrun | c. Two 4 ounce cube samples were run through a manually operated cheese grater and then beaten with a hand held electric mixer.

| Conventional Freezer | 111% overrun |
|---|---|
| Quick Freeze | 127% overrun | d. Two 4 ounce samples were forced through a hand operated meat grinder, used normally to prepare hamburger.

| Conventional Freezer | 109% overrun |
|---|---|
| Quick Freeze | 113% overrun* |

*13% increase over the original 100%.

e. When a Vita-Mix blender and an off the shelf household blender were each used, it was found that neither was operative to provide overrun, due to the necessity to add water to solids to beat them up. The addition of water dilutes the fruit and is contrary to the procedure of this invention.

The following examples illustrate the preparation of frozen desserts according to this invention.

EXAMPLE 8

STRAWBERRY-BANANA

Approximately 8 ounces of ripe peeled banana were blended with 64 grams of fresh sliced strawberries in a large glass bowl by mashing the banana and stirring it with the strawberries. The mixture was spooned into several empty openings in a plastic ice cube tray and then covered with plastic and flash frozen by immersing the tray into a tank of liquid nitrogen. After 6 minutes the tray was removed and the cubed composite was found to be frozen solid and stored at −5° F.

The following day the frozen composite was then subjected to mastication procedure and whipped to entrain air. The increase in volume was found to be 60%, i.e. an overrun of 160%. The product, which was dark pink in color was spooned onto a plate and served immediately.

EXAMPLE 9

BANANA

Sixteen ounces of mashed ripe banana were mashed and was spooned into a plastic ice cube tray and frozen in the manner recited in Example 8. After quick freezing the tray it was removed from the nitrogen tank, and stored in a conventional home freezer for future use.

About two weeks later, 8 ounces of the frozen composite were masticated in a customized Champion Juicer and whipped with an electric mixer to an overrun of about 160% and then served. The balance of the frozen composite was returned to the home freezer in the zip lock bag.

EXAMPLE 10

BANANA

Eight ounces of ripe banana sections were placed in liquid nitrogen and allowed to solidify. After 6 minutes, the frozen composite was removed, and stored at −5° F. for one day and then masticated by a cheese grater and then whipped using a hand held electric mixer. Overrun was believed to be about 127%. The frozen dessert had a smooth frozen yogurt like mouth feel.

The following further examples illustrate the preparation of additional composites suitable for the preparation of frozen desserts according to the procedure described previously.

EXAMPLE 11

BANANA AND COCOA POWDER

As is known, chocolate liquor differs from cocoa powder in that the fat is removed in the formation of the cocoa powder. Pure cocoa powder was used. Using 8 ounces of banana as a constant I added more and more cocoa in one-half gram increments. In taste tests, the best flavor was obtained between two and three grams of cocoa powder per 8 ounces of banana. At four grams of cocoa flavor was too strong. Color was good for all mixtures.

EXAMPLE 12

BANANA AND WALNUTS

I added incremental grams of walnuts to a constant 8 ounces of banana. The walnut flavor started to be noticed at 10 grams walnuts and became too intense at 20 grams. The best flavor was judged to be between 14 and 16 grams of nuts. The walnut as with other nut flavors masked the banana taste within the preferred range of the flavorant.

EXAMPLE 13

BANANA AND PECAN AND CHOCOLATE LIQUOR

Using the same method as previously described for Example 5, with respect to banana and chocolate liquor I added incremental grams of pecan as well as chocolate liquor. It was found that at about 16 grams of pecans and about 5 grams of chocolate liquor provided the optimum flavor combination. Significantly greater amounts of either ingredient turned out to be overpowering to the palate while lesser amounts did not deliver the desired flavor. Color was constant throughout the range of experiments.

EXAMPLE 14

BANANA AND ANISEED (LICORICE)

Whole aniseeds were added to 8 ounces of banana at one-quarter teaspoon intervals. At one-quarter teaspoon the anise was barely detectable and the best results were achieved between the range of one-half and three-quarter teaspoons per 8 ounce of banana. 1 and 1.25 teaspoons of aniseed were found to be too strong. [One teaspoon = 1 gram].

It is seen that in all of the examples previously set forth, the additional flavorant was mixed with the banana in the formation of the composite.

It is also within the scope of this invention to add the other or additional flavorant, to a preformed banana only composite, during the mastication step, and if a liquid, as late as the aeration step.

For example, when 64 grams of fresh strawberries which had been refrigerated were masticated with a banana only composite, and then aerated, an overrun of about 150 per cent was obtained, and the product had satisfactory taste and mouth feel.

Similar tests were run with pecans and blueberries, and again satisfactory taste and mouth feel resulted.

When peppermint flavor in an amount equal to that employed in Exhibit 6, was added to a masticated banana composite during aeration, little or no difference in the end product could be detected compared to the dessert proposed in accordance with Exhibit 6.

In order to confirm my theory that the chemistry of bananas played a significant role in the achievement of the desired quality product, I tested other fruits under similar operating procedures. Thus when I tested other fruits which had been frozen and then masticated and whipped into a dessert product banana alone, or in combination with the flavor discussed previously, gave overrun readings in the neighborhood of 125 to 180 per cent. There were no perceived ice crystals and a very pleasant mouth feel similar to that of frozen yogurt or soft serve ice cream.

On the other hand watermelon tended to be very slushy and developed a lot of ice crystals with no real flavor or sweetness. Because of the high moisture content there was very little overrun.

Cantaloupes were also tested and found to be very slushy. A large number of ice crystals formed and again there was no real flavor or sweetness along with very low overrun.

I then moved on to test other fruits that had more body to them. However when pineapple was subjected to the procedures of this invention, in an attempt to achieve a dessert, it was found that it was quite slushy with some ice crystals and not very sweet. While not being relatively not very good, it was believed to be better than the melons.

Similar results were achieved in test involving apples and oranges.

I am aware that other inventors have prepared non-dairy frozen desserts based on fruit bases. In all of these additives of one sort or another have been included in their formulations, but not in mine.

In order to demonstrate the superiority of my product a typical prior art product, I have run a comparison of my product against the product disclosed and claimed in the Blake et al U.S. Pat. No. 4,368,211.

| BLAKE | FELDPAUSCH |
|---|---|
| Simultaneous freezing and aeration. | Quick freezing, subsequent mastication with aeration simultaneously to mastication or subsequent thereto. |
| Texture uneven with many ice crystals and lumps of unfrozen fruit. | Texture smooth, creamy, no detected ice crystals. |
| Color yellow to light brown. | Color white. |

| -continued | |
|---|---|
| BLAKE | FELDPAUSCH |
| Flavor uneven and unappealing. | Flavor clean, even and refreshing. |
| Storage −10 degrees F. started to turn brown in twelve hours. | Storage −10 degrees F. stays white for months. |

To arrive at these conclusions I used whole peeled bananas only, that were mashed to form a composite. For "Blake" I used an ice cream machine to approximate the system used in the Blake patent column 8 lines 57 to 63. Each sample tested was about 12 ounces. Dwell time in the Taylor ice cream machine was 20 minutes, for Blake. My process started with a quick freeze procedure which took about 10 minutes, followed by about a minute period of mastication and aeration of the prefrozen sample.

The following is a discussion of each item in more detail.

Texture: Since Feldpausch used no emulsifiers of stabilizers, fats or added sugars (all of which contribute to the small size of ice crystals and creaminess of final product) it is not surprising to see that large ice crystals would be in Blake's product. The presence of lumps of unfrozen fruit is caused by the fact that the "Blake" method utilizes the traditional method of blades scraping the sides of a frozen cylinder. Thus the cylinder is what freezes the product.

Since I am using mashed whole fruit, which has not been reduced to a puree, one finds pieces or particles that are too large to freeze on the walls of the frozen cylinder when a Blake apparatus is employed. Therefore these pieces stay in the center and do not freeze.

In the Blake procedure it is critical to use fruit puree and even deseeders to ensure very small particles (column 3 lines 49 and 54 to column 9 lines 33 to 36). This was because a seed as small as a strawberry seed would get caught between blade and cylinder and score the cylinder rendering it unusable.

Feldpausch does not deseed or pulverize his fruit but only mashes it to form a composite prior to quick freezing. Thus, Feldpausch's raw material could not even be used in commercially available soft serve frozen dessert machines like the Taylor unit to make a frozen dessert.

Color: The discussion above on the enzyme polyphenoloxidase discussed elsewhere herein, constitutes the reason the color of the Blake method started to turn brown. It proves the point that bananas are very sensitive to how they are frozen even when stored at −10 degrees F.

Flavor: Since Blake uses a slow method of freezing but with added whipping agents, gums, sweetening agents and fat (all of which enhance flavor and reduce the size of ice crystals) he ends up with a creamy product. Feldpausch does not add any of these, so when I put mashed bananas (only) into a Taylor machine and use the Blake method large ice crystals form which interfere with flavor perception in your mouth. Thus the uniqueness of the quick freeze, masticate, aerate procedure can be seen.

It is seen that I have provided an improved frozen dessert that utilizes no added fat stabilizers, gums or other additives. Though if desired, a minor amount of an antioxidant from the GRAS list can be added to the straw colored products, such as all banana or pineapple banana to prevent browning due to oxidation. When strawberries, blueberries and the like are added, the need for anti-oxidants is lessened, as the color is provided by the additional ingredient.

The frozen composite of this invention can be stored for several months prior to the preparation of the ultimate dessert, thereby allowing the homeowner to prepare large portions at one time for future use.

Since certain changes can be made in the above product without departing from the scope of the invention, it is intended that all matter contained in the above description shall be interpreted as illustrative and not in a limiting sense.

I claim:

1. A nondairy frozen dessert composition consisting essentially of:
   an aerated masticated banana based composite having an overrun of between about 135 percent and 185 per cent, said composite consisting essentially of
   (a) 100 to about 66 percent of quick frozen banana alone or in combination with other flavorants which composite has reached a frozen state prior to significant enzymatic deterioration from polyphenoloxiadase present in the bananas, and
   (b) 0 to about 34 percent other flavorant based on total weight of the composite.

2. The nondairy frozen dessert of claim 1 wherein the composite consists essentially of
   (a) 100 to about 66 percent banana, and at least one other flavorant sellected from the group consisting of
   (b) 0 to about 34 percent added fruit;
   (c) 0 to about 12 percent nutmeates;
   (d) 0 to about 1 percent flavoring oils based on total weight of the composite.

3. The nondairy frozen dessert of claim 1 wherein composite consists essentially of
   (a) 100 to about 97 percent banana;
   (b) 1 to about 3.4 percent of another flavorant selected from the group consisting of chocolate liquors, cocoa powder and carob.

4. The nondairy frozen dessert of claim 1 wherein the composite is 100 percent banana.

5. The nondairy frozen dessert of claim 2 wherein the other flavorant is strawberries, and the strawberries are present in an amount of from 22 percent to 33 percent based on total weight of the composite.

6. The nondairy frozen dessert of claim 2 wherein the other flavorant is peppermint.

7. The nondairy frozen dessert of claim 2 wherein the other flavorant is nutmeats, and said nutmeats are present in an amount of from 6 percent to about 12 percent of the total weight of the composite.

8. The nondairy frozen dessert of claim 7 wherein the nutmeats are pecans.

9. The nondairy frozen dessert of claim 7 wherein the nutmeats are walnuts.

10. The nondairy frozen dessert of claim 2 wherein the other flavorant is a combination of two flavorants.

11. The nondairy frozen dessert of claim 10 wherein the other flavorant is a combination of pecans and chocolate liquor.

12. The nondairy frozen dessert of claim 2 wherein the other flavorant is fruit.

13. The nondairy frozen dessert of claim 12 wherein the fruit is pineapple.

14. The nondairy frozen dessert of claim 5 wherein the strawberries are present within the range of 22 to 33 percent by total weight of composite.

* * * * *